March 22, 1960    B. C. WEBSTER    2,930,022
CORD CLAMP FOR ELECTRICAL WIRING DEVICE
Filed July 2, 1956

INVENTOR
Benjamin C. Webster
BY
Wooster & Davis
ATTORNEYS.

United States Patent Office 2,930,022
Patented Mar. 22, 1960

2,930,022

CORD CLAMP FOR ELECTRICAL WIRING DEVICE

Benjamin C. Webster, Fairfield, Conn., assignor to Harvey Hubbell, Incorporated, Bridgeport, Conn., a corporation of Connecticut Application July 2, 1956, Serial No. 595,439

3 Claims. (Cl. 339—103)

This invention relates to cord clamps for electrical wiring devices, and has for an object to provide a simple and improved clamp for the insulated conductor cord or cable having its lead wires connected to electrical contacts in the device to relieve strain of a pull on the cord on the connecting means securing the leads to the contacts, which clamps and the means for securing them to the wiring device are so constructed and arranged as to permit greater radial or lateral movement of the clamps to accommodate cords of a greater range in diameter without becoming disconnected from the electrical device, than is possible with conventional types of cord or strain relief clamps.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 2:
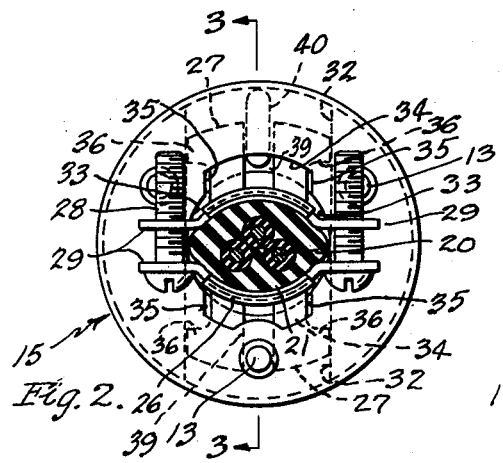
Fig. 2 is a top plan view thereof showing the cord or cable in section.

As previously indicated, this improved clamp is shown in the drawing as applied to an electrical wiring device comprising a connector having receptacle contacts mounted in the device for engagement by the blade contacts of an attachment plug cap plugged into this connector to complete electrical connection between the connector and the cap, but it is to be understood this particular wiring device is used merely for purposes of illustration as this cord clamp is adapted for use with other electrical wiring devices where the use of such a clamp or strain relief is desirable.

The connector shown comprises an insulating body 10 including two sections which, for purposes of identification, will be called upper and lower sections 11 and 12, connected by suitable screws 13 extending through the two sections and threaded as shown at 17 into a metal top wall 14 over the upper end wall or surface of the upper section 11. This top wall may be the cross wall of a cupped shell 15 having downwardly extending side walls 16 embracing the upper section and the upper portion of the lower section, and thus covering the division between the two sections.

The lower section 12 is provided with spaced chambers 18 to receive receptacle contacts 19 only one of which is shown, but the number may vary depending on the device being used. In this case the connector has three contacts to which are connected the three conductor wires 20 of the insulating conductor cord or cable 21. The lower end of the member 12 is provided with contact blade inlet slots 22 leading to these chambers for entrance of the contact blades of an attachment plug cap to engage the receptacle contacts 19 and provide electrical connection between the receptacle or connector and the cap. In the specific construction shown the contact 19 has laterally extending top walls or feet 23 at the upper end surface of the member 12 against which the bared end 24 of a conductor wire 20 is clamped by the lower surface of the upper member 11 to effect electrical connection from a conductor or lead wire in the cord or cable to the contact 19.

The cord clamp comprises a pair of opposed clamping members 25 each comprising a curved clamping or body portion 26 and a foot portion 27 extending laterally from the lower end of the body or clamping portion at substantially right angles thereto. The body or clamping portion 26 is curved laterally so that these opposed portions of the two clamps may be clamped on the opposite sides of the cord or cable 21 by suitable screws 28 extending through laterally extending ears or lugs 29 on opposite side edges of these clamping portions 26, with the screws passing through the ears of one clamping member and threaded into the ears of the other. The upper member 11 is provided with passage means to permit connection of the bared ends of the conductor wires to the receptacle contacts 19, and this means may comprise one or more openings 30 for the conductor wires and the inner end of the cord or cable.

The upper end wall or surface 31 of the upper section 11 is provided with radially extending channels 32 extending in opposite directions from the openings or passage means 30 and under the top wall 14. This top wall 14 is provided with a central opening 33 to permit entrance of the cord or cable, and this opening is provided with radially extending cutouts or recesses 34 on opposite sides thereof over the channels 32. These cutouts or recesses are of less width than the channels 32 so that at their opposite side edges 35 they overhang the sides of the channels 32. The cord clamps 25 are mounted with their foot portions 27 located in these channels 32 between the bottom walls of these channels and the top wall 14 so as to be guided for lateral or radial movement in these channels, and are retained in the channels by the top wall 14. The outer end portions of these feet are wider than the cutouts or recesses 34, thus providing laterally extending ears 36 under the top wall 14 adjacent the opposite sides of the channels 32, which are overlapped by the top wall 14 and the overhanging portions 35 at the sides of the cutouts or recesses. The lower portions 37 of the body or clamping portions 26 at the upper sides of the feet 27 are somewhat narrower than the cutouts or recesses 34 so that they may be shifted into these recesses to permit greater outward movement of the clamps, and it is also preferred that the portions 38 of the feet 27 between the lugs 36 and the portions 37 be of substantially the same width.

Figure 1:
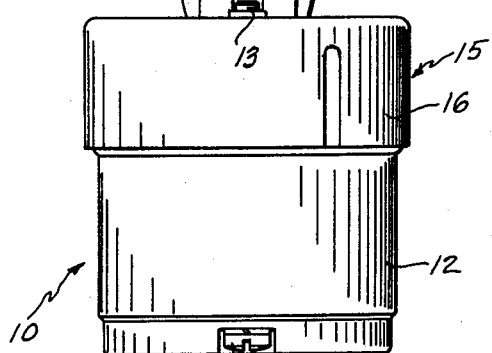
Fig. 1 is a side elevation of an electrical wiring device, specifically a connector, with this cord clamp applied thereto and showing it clamped against the opposite sides of an insulated conductor cord or cable.
Figures 5, 6:
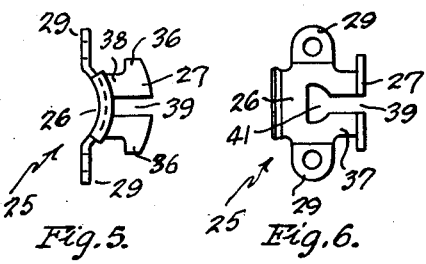
Fig. 5 is a top plan view of one of the members of the clamp.
Fig. 6 is a side view thereof looking from the right of Fig. 5.
Figure 7:
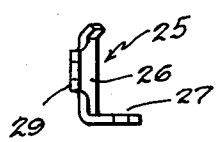
Fig. 7 is an edge view looking toward the bottom of Fig. 5.
Figure 4:
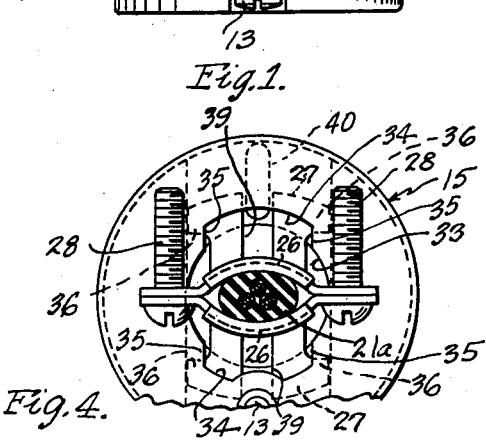
Fig. 4 is a view similar to Fig. 2 showing how the cord or clamp may be used with a cable of smaller diameter.

This arrangement of the cutouts or recesses 34 of less width than the channels 32 and thus providing walls overhanging the channels at the opposite side edges 35 of these recesses permits much greater lateral movement of the clamps without the feet becoming disconnected from the wiring device than is possible with the conventional type of cord clamp. Thus with the larger sizes of cord clamps the outer widened end portions of the feet, including the lugs 36, are retained under the top wall 14, as shown in Fig. 1, but with smaller types of cords (21a, Fig. 4) these clamps may be drawn inwardly toward each other but still held in the channels 32 by the top wall 14 including the overhanging portions at the opposite side edges 35 of the cutouts or recesses 34, as shown in Fig. 4. This construction and arrangement will also maintain connection between the feet of the clamps and the wiring device even should the cord be offset or located to one side of the center of the opening 34, as it will be seen from Fig. 4, the clamps would be capable of considerably greater movement inwardly from the position indicated, and still the lugs 36 of the feet would be retained by the overhanging edge portions 35 of the cutouts 34. Furthermore, these cutouts or recesses are adapted to receive the narrower lower portions 37 of the clamping or body portions and thus permit the clamps to be shifted outwardly a greater distance than would be possible without these cutouts in the opening 33. Therefore, the combination of these wider outer end portions of the feet providing the lugs 36, the radially extending cutouts or recesses 34, their overhanging portions 35, and the narrower portions 37 provide for and permit much greater lateral movement of the clamping members without the feet becoming dislodged or disconnected from the device, than is possible with the conventional type of cord clamp. It therefore permits use of this clamp with greater range of different diameters of cords or cables, and also permits the use of this clamp with greater lateral or offset positions of the cord from the center of the opening 34 in the top wall 14.

As the number of connecting screws 13 used with a three-wire cord or cable is usually three, so they are located between the contacts 19 and the lead wires connected thereto, one of the screws would be located in one of the channels 32. Therefore to prevent interference of the screw with movement of the clamp 25, the foot of the clamp is radially slotted as indicated at 39 to straddle this screw and permit full range of movement of the clamp. There may be a rib or lug 40 on upper member 11 in the opposite channel to enter the slot of the other clamp and also to support the center portion of the end wall in the channel. These slots 39 also coact with the screw 13 and lug 40 to provide guide means to prevent lateral rocking movement of the feet 27 of the clamps in the channels 32 due to the relative narrow width of the lugs 36 on the feet. They thus insure that the clamps have a straight in and out radial movement and the lugs 36 are retained in proper relation to the overhanging portions of the end wall 14 of cap 15.

Figure 3:
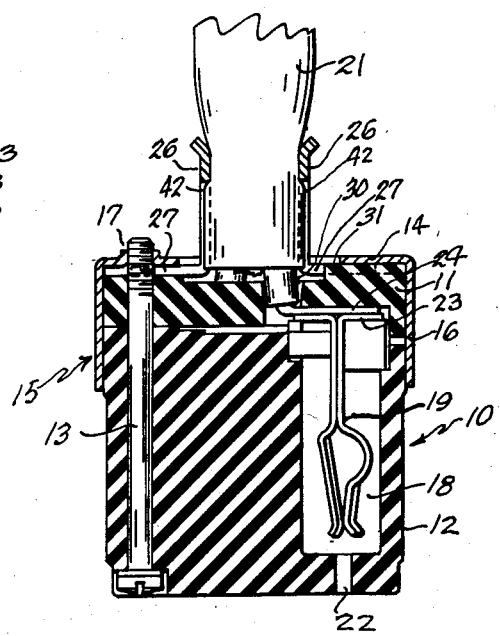
Fig. 3 is a longitudinal section of the electrical device substantially on line 3—3 of Fig. 2.

The side wall of the curved body or clamping portion 26 is preferably provided with a generally T-shaped opening 41 so that when clamped against the sides of the conductor cord or cable these openings permit the rubber of the cord to enter this area, as shown at 42, Fig. 3, providing a greater gripping and holding effect than would a plain unperforated side wall.

It will be seen from the above that this construction and arrangement provides a simple and effective cord clamp or strain relief in which the clamping members are capable of much greater adjustment or lateral movement toward and from each other to permit use of the clamp on insulating cords or cables of a much greater range of different diameters, without the feet of the clamps becoming dislodged or disconnected from the wiring device, than is possible with the conventional type of cord clamp.

Having thus set forth the nature of my invention, I claim:

1. An electrical wiring device comprising an insulating body and electrical contacts mounted thereon, said body provided with substantially centrally disposed passage means for conductor wires in an insulated conductor cord connected to said contacts, said body provided with radial channels in its upper end wall extending outwardly in opposite directions from said passage means and including parallel side walls, a top wall secured to the body over said channels provided with a central opening including radially extending recesses at the opposite sides thereof located over said channels and of less width than the channels so the top wall extends inwardly over and overhangs the channels at their opposite side edges, a pair of clamps including opposed clamping portions adapted to be clamped to the opposite sides of an insulated conductor cable having its lead wires connected to the contacts and feet extending laterally in opposite directions at the inner ends of said clamping portions mounted in the channels under the top wall for radial sliding movement therein, the outer end portions of the feet being of greater width than said recesses providing guide lugs retained in the channels by said top wall and adapted to move under said overhanging portions of the top wall to retain the feet in the channels when the clamps are moved to their innermost positions, guide means in the channels, said feet provided with longitudinal slots embracing said guide means to prevent lateral rocking movement of the feet, the lower portions of the clamping portions of somewhat less width than the recesses permitting them to be moved into said recesses by outward movement of the clamps, and screws connecting the clamping portions to clamp them on opposite sides of the cable.

2. An electrical wiring device comprising an insulating body and electrical contacts mounted therein, said body provided with at least one opening in its top wall for passage of lead wires from an insulated conductor cable to the contacts, said body also provided with transverse channels in its top surface extending radially outwardly in opposite directions from said opening, a top wall secured to the body over said channels provided with an opening for the cable, a pair of clamps including body portions adapted to be clamped against opposite sides of the cable and laterally extending feet at their lower ends located in the channels and slidably retained therein by the top wall to permit movement of the clamps toward and from the cable, screws connecting said body portions of the clamps to clamp them on the cable, and said body portions provided with substantially T-shaped openings comprising stems and cross bars of a width into which the outer rubber insulation of the cable may enter as it is compressed between the clamps to increase their grip on the cable, said openings arranged with the stem extending longitudinally of the body of the clamp and the cross bar at the outer end thereof.

3. An electrical wiring device comprising an insulating body and electrical contacts mounted thereon, said body provided with substantially centrally disposed passage means for conductor wires in an insulated conductor cord connected to said contacts, said body provided with radial channels in its upper end wall extending outwardly in opposite directions from said passage means and including parallel side walls, a top wall secured to the body over said channels provided with a central opening including radially extending recesses at the opposite sides thereof located over said channels and of less width than the channels so the top wall extends inwardly over and overhangs the channels at their opposite side edges, a pair of clamps including opposed clamping portions adapted to be clamped to the opposite sides of an insulated conductor cable having its lead wires connected to the contacts and feet extending laterally in opposite directions at the inner ends of said clamping portions mounted in the channels under the top wall for radial sliding movement therein, the outer end portions of the feet being of greater width than said recesses providing guide lugs retained in the channels by said top wall and adapted to move under said overhanging portions of the top wall to retain the feet in the channels when the clamps are moved to their innermost position, guide means in the channels, said feet provided with longitudinal slots extending inwardly from their outer ends and embracing said guide means to prevent lateral rocking movement of the feet, the lower portions of the clamping portions of somewhat less width than the recesses permitting them to move into said recesses by outward movement of the clamps, screws connecting the clamping portions to clamp them on opposite sides of the cable, and said body portions provided with substantially T-shaped openings comprising stems and cross bars of a width to permit the outer rubber insulation of the cable to enter as it is compressed between the clamps to increase their grip on the cable, said openings arranged with the stems extending longitudinally of the bodies of the clamp as continuations of the slots in the feet and the cross bars at the outer ends thereof.

References Cited in the file of this patent

UNITED STATES PATENTS

| | | |
|---|---|---|
| 989,853 | Kruse | Apr. 18, 1911 |
| 1,679,723 | Hubbell | Aug. 7, 1928 |
| 2,102,625 | Hubbell | Dec. 21, 1937 |
| 2,683,864 | Hubbell | July 13, 1954 |
| 2,753,537 | Hubbell | July 3, 1956 |

FOREIGN PATENTS

| | | |
|---|---|---|
| 576,535 | Great Britain | Apr. 19, 1946 |